(12) United States Patent
Woo

(10) Patent No.: US 10,254,598 B2
(45) Date of Patent: Apr. 9, 2019

(54) LIQUID CRYSTAL DISPLAY

(71) Applicant: Samsung Display Co. Ltd., Yongin-si, Gyeonggi-do (KR)

(72) Inventor: Hwa Sung Woo, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 175 days.

(21) Appl. No.: 15/292,266

(22) Filed: Oct. 13, 2016

(65) Prior Publication Data

US 2017/0299927 A1    Oct. 19, 2017

(30) Foreign Application Priority Data

Apr. 18, 2016    (KR) .................. 10-2016-0046796

(51) Int. Cl.
*G02F 1/1343*    (2006.01)
*G02F 1/1362*    (2006.01)
(Continued)

(52) U.S. Cl.
CPC .. *G02F 1/134336* (2013.01); *G02F 1/133514* (2013.01); *G02F 1/133707* (2013.01); *G02F 1/134363* (2013.01); *G02F 1/136286* (2013.01); *G02F 2001/133519* (2013.01); *G02F 2001/134318* (2013.01); *G02F 2001/134345* (2013.01); *G02F 2001/134354* (2013.01); *G02F 2001/134372* (2013.01); *G02F 2201/12* (2013.01); *G02F 2201/121* (2013.01); *G02F 2201/123* (2013.01); *G02F 2201/124* (2013.01)

(58) Field of Classification Search
CPC ......... G02F 1/134336; G02F 1/136286; G02F 1/133512; G02F 1/133514; G02F 2001/133519; G02F 2201/121; G02F 2001/134345; G02F 2201/123; G02F 2001/134318
See application file for complete search history.

(56) References Cited

U.S. PATENT DOCUMENTS 9,151,995 B2 * 10/2015 Tseng ................ G02F 1/134309
9,857,641 B2 *  1/2018 Shin .................. G02F 1/134336
(Continued)

FOREIGN PATENT DOCUMENTS

KR    1020130102285 A    9/2013
KR    1020150126485 A    11/2015

*Primary Examiner* — Hoan C Nguyen
(74) *Attorney, Agent, or Firm* — Cantor Colburn LLP

(57) ABSTRACT

A liquid crystal display including a first substrate; a pixel electrode which includes a first subpixel electrode and a second subpixel electrode disposed adjacent to and spaced apart from the first subpixel electrode on the first substrate; a second substrate facing the first substrate; and a common electrode disposed on the second substrate and defines a first slit thereof and a second slit thereof which is connected to the first slit. The first subpixel electrode defines a first plate-shaped portion overlapping the first slit and a plurality of first branches which extend from the first plate-shaped portion, and the second subpixel electrode defines a second plate-shaped portion overlapping the second slit and a plurality of second branch portions which extend from the second plate-shaped portion. At least one of the first branch portions is connected to at least one of the second branch portions.

21 Claims, 18 Drawing Sheets

(51) Int. Cl.
*G02F 1/1335* (2006.01)
*G02F 1/1337* (2006.01)

(56) References Cited

U.S. PATENT DOCUMENTS

| | | | | |
|---|---|---|---|---|
| 2004/0095521 | A1* | 5/2004 | Song | G02F 1/133514 349/61 |
| 2013/0265533 | A1* | 10/2013 | Lim | G02F 1/133707 349/130 |
| 2014/0168582 | A1* | 6/2014 | Chang | G02F 1/134309 349/106 |
| 2015/0309375 | A1* | 10/2015 | Chang | G02F 1/134309 349/33 |
| 2016/0109767 | A1* | 4/2016 | Yun | G02F 1/134309 349/129 |

* cited by examiner

LIQUID CRYSTAL DISPLAY

This application claims priority to Korean Patent Application No. 10-2016-0046796 filed on Apr. 18, 2016, and all the benefits accruing therefrom under 35 U.S.C. § 119, the content of which in its entirety is herein incorporated by reference.

BACKGROUND

1. Field

The invention relates to a liquid crystal display ("LCD").

2. Description of the Related Art

With the development of multimedia, the importance of display devices is increasing. Accordingly, various types of display devices such as liquid crystal displays ("LCDs") and organic light-emitting displays ("OLEDs") are being used.

In particular, LCDs are one of the most widely used types of flat panel displays. Generally, an LCD includes a pair of display substrates having field generating electrodes, such as pixel electrodes and a common electrode, and a liquid crystal layer interposed between the two display substrates. In an LCD, voltages are applied to the field generating electrodes to generate an electric field in the liquid crystal layer. Accordingly, the alignment of liquid crystal molecules of the liquid crystal layer is determined, and polarization of incident light is controlled by the alignment. As a result, a desired image is displayed on the LCD.

In a vertically aligned ("VA") mode LCD, for example, the tilt direction of liquid crystal molecules is controlled by placing a field generating electrode on each of a lower substrate and an upper substrate and forming a slit pattern in one or more field generating electrode.

SUMMARY

One or more exemplary embodiment of the invention provide a liquid crystal display ("LCD") structured to have a reduced texture phenomenon even when a misalignment occurs in the process of bonding a lower display substrate and an upper display substrate together.

One or more exemplary embodiment of the invention also provides an LCD structured to reduce or effectively prevent a reduction in transmittance.

However, the invention is not restricted to the exemplary embodiments set forth herein. The above and other features of the invention will become more apparent to one of ordinary skill in the art to which the invention pertains by referencing the detailed description of the invention given below.

An exemplary embodiment of the invention discloses a liquid crystal display ("LCD") including: a first substrate; a pixel electrode which includes a first subpixel electrode and a second subpixel electrode which is disposed adjacent to and spaced apart from the first subpixel electrode, on the first substrate; a second substrate which faces the first substrate; and a common electrode which is disposed on the second substrate and defines a first slit portion thereof and a second slit portion thereof which is connected to the first slit portion. The first subpixel electrode defines a first plate-shaped portion thereof which overlaps the first slit portion of the common electrode, and a plurality of first branch portions thereof which extend from the first plate-shaped portion. The second subpixel electrode defines a second plate-shaped portion thereof which overlaps the second slit portion of the common electrode, and a plurality of second branch portions thereof which extend from the second plate-shaped portion. At least one of the first branch portions of the first subpixel electrode is connected to at least one of the second branch portions of the second subpixel electrode.

An exemplary embodiment of the invention also discloses an LCD including: a first substrate; a pixel electrode which includes a first subpixel electrode and a second subpixel electrode which is disposed adjacent to and spaced apart from the first subpixel electrode, on the first substrate; a second substrate which faces the first substrate; and a common electrode which is disposed on the second substrate and defines a first slit portion thereof overlapping the first subpixel electrode and a second slit portion thereof overlapping the second subpixel electrode. The first slit portion defines a first horizontal portion thereof defining a length of the first horizontal portion which extends in a first direction, and a first vertical portion thereof defining a length of the first vertical portion which extends in a second direction different from the first direction and intersects the first horizontal portion. The second slit portion defines a second horizontal portion thereof defining a length of the second horizontal portion which extends in the first direction, and a second vertical portion thereof defining a length of the second vertical portion which extends in the second direction and intersects the second horizontal portion. The first horizontal portion and the second horizontal portion are connected to each other at a first connecting area, and the first connecting area does not overlap the first subpixel electrode or the second subpixel electrode.

It is to be understood that both the foregoing general description and the following detailed description are exemplary and explanatory and are intended to provide further explanation of the invention as claimed.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
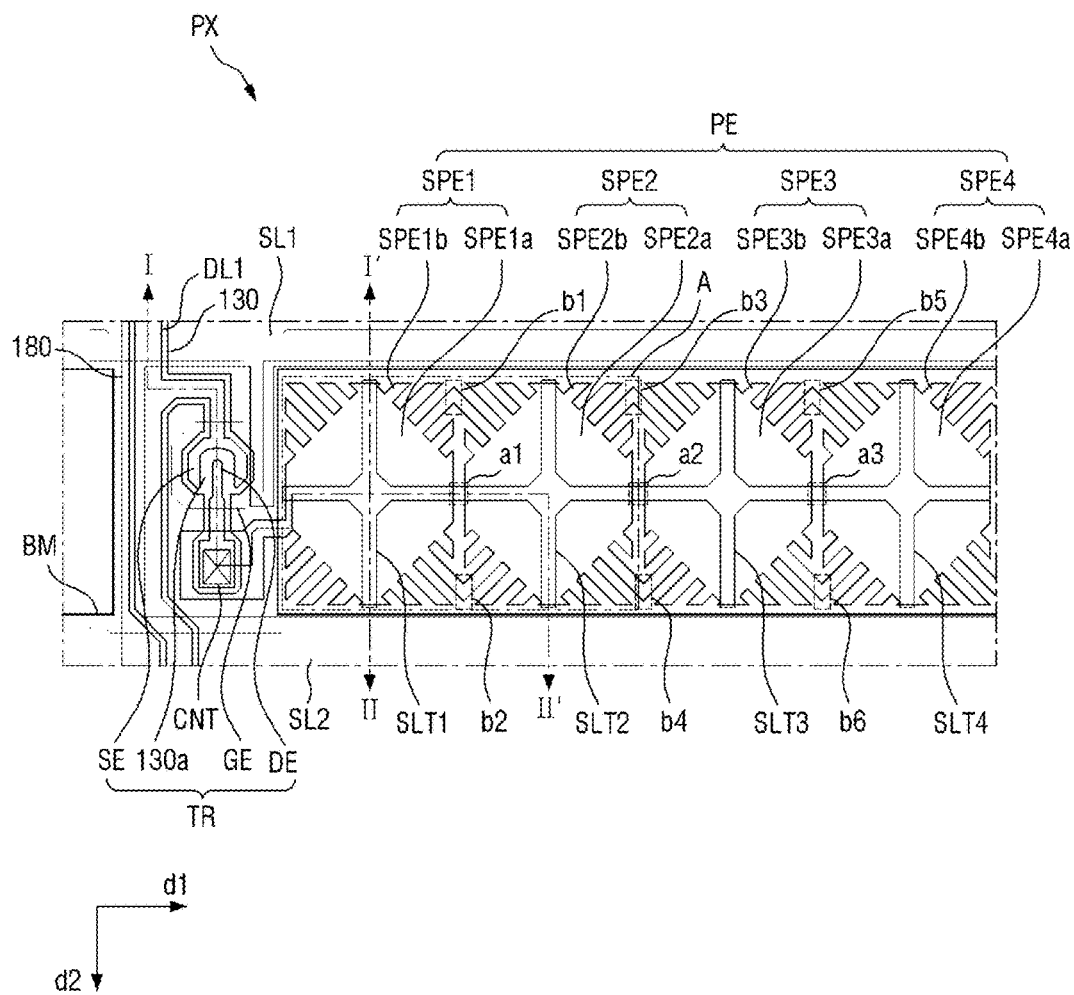
FIG. 1 is a top plan view of an exemplary embodiment of a pixel portion of a liquid crystal display ("LCD") according to the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to" or "coupled to" another element or layer, it may be directly on, connected to or coupled to the other element or layer or intervening elements or layers may be present. When, however, an element or layer is referred to as being "directly on," "directly connected to" or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. As used herein, the term "and/or" includes any and all combinations of one or more of the associated listed items. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a top plan view of an exemplary embodiment of a pixel portion PX in a liquid crystal display ("LCD") according to an embodiment of the invention. An image may be displayed at the pixel portion PX of the LCD. The pixel portion PX may be defined by a pixel area at which light is transmitted and an image is displayed, and a non-pixel area thereof at which the light is not transmitted. The pixel portion PX may be disposed in a display area of the LCD, where the pixel portion PX may not be disposed in a non-display area of the LCD excluding the display area thereof.

Referring to FIG. 1, an exemplary embodiment of the LCD according to the invention may include the pixel portion PX, a common electrode CE (see FIG. 2), a first scan line SL1, a second scan line SL2, a first data line DL1, a black matrix BM and a semiconductor layer 130. Portions of the common electrode CE, the first scan line SL1, the second scan line SL2, the first data line DL1, the black matrix BM and the semiconductor layer 130 are disposed in the pixel portion PX.

The pixel portion PX may include a switching device TR and a pixel electrode PE. According to an exemplary embodiment, the switching device TR may be a three-terminal device such as a thin-film transistor ("TFT"). The switching device TR may have a control electrode connected to or extended from the first scan line SL1, and a first electrode connected to or extended from the first data line DL1. In addition, a second electrode of the switching device TR may be connected to the pixel electrode PE. Hereinafter, the switching device TR as a TFT will be described as an example. Accordingly, the control electrode, the first electrode and the second electrode of the switching device TR will be referred to as a gate electrode GE, a source electrode SE and a drain electrode DE, respectively.

The switching device TR may be turned on by a scan signal transmitted through and received from the first scan line SL1, and may provide a data signal transmitted through and received from the first data line DL1 to the pixel electrode PE.

The pixel electrode PE may include two or more subpixel electrodes. Referring to FIG. 1, the pixel electrode PE may include or be defined by first and second subpixel electrodes SPE1 and SPE2 which are spaced apart from each other. According to an exemplary embodiment, the first and second subpixel electrodes SPE1 and SPE2 may be disposed adjacent to each other along a first direction d1. That is, the first and second subpixel electrodes SPE1 and SPE2 may be disposed in the same row within the display area of the LCD. However, the invention is not limited thereto, and the first and second subpixel electrodes SPE1 and SPE2 may also be disposed adjacent to each other along a second direction d2, e.g., in the same column within the display area of the LCD. Here, the first direction d1 may vertically (e.g., perpendicularly) intersect the second direction d2. In FIG. 1, the first direction d1 is a row direction, and the second direction d2 is a column direction.

The first subpixel electrode SPE1 may include a first plate-shaped portion SPE1a and a first branch portion SPE1b provided in plurality. According to an exemplary embodiment, the first plate-shaped portion SPE1a may be a rhombic plate shape. Here, the plate shape is defined as a whole plate shape that is not divided and in which an opening or slit is not defined. The first plate-shaped portion SPE1a may overlap a first slit portion SLT1 which will be described later. The first branch portions SPE1b may define a width thereof and a length thereof which is larger than the width and extends from the first plate-shaped portion SPE1a. According to an exemplary embodiment, the first branch portions SPE1b may lengthwise extend from at least one of four outer edges of the rhombic first plate-shaped portion SPE1a. In addition, the first branch portion SPE1b may not overlap the first slit portion SLT1.

The second subpixel electrode SPE2 may include a second plate-shaped portion SPE2a and a second branch portion SPE2b provided in plurality. According to an exemplary embodiment, the second plate-shaped portion SPE2a may be a rhombic plate shape. The second plate-shaped portion SPE2a may overlap a second slit portion SLT2 which will be described later. The second branch portions SPE2b may define a width thereof and a length thereof which is larger than the width and extends from the second plate-shaped portion SPE2a. According to an embodiment, the second branch portions SPE2b may lengthwise extend from at least one of four outer edges of the rhombic second plate-shaped portion SPE2a. In addition, the second branch portions SPE2b may not overlap the second slit portion SLT2.

At least one of the first branch portions SPE1b may be connected to at least one of the second branch portions SPE2b. Referring to FIG. 1, the first branch portions SPE1b may respectively be connected to the second branch portions SPE2b in b1 and b2 areas. In FIG. 1, one first branch portion SPE1b is connected to one second branch portion SPE2b in each of the b1 and b2 areas. However, the invention is not limited thereto. Consequently, with the first branch portion SPE1b connected to the second branch portion SPE2b in each of the b1 and b2 areas, the first subpixel electrode SPE1 is connected to the second subpixel electrode SPE2.

The pixel electrode PE may further include third and fourth subpixel electrodes SPE3 and SPE4. The third and fourth subpixel electrodes SPE3 and SPE4 may be adjacent to each other in the same direction as the direction in which the first and second subpixel electrodes SPE1 and SPE2 are disposed adjacent.

The third subpixel electrode SPE3 may include a third plate-shaped portion SPE3a and a third branch portion SPE3b which is provided in plurality and lengthwise extend from the third plate-shaped portion SPE3a. The fourth subpixel electrode SPE4 may include a fourth plate-shaped portion SPE4a and a fourth branch portion SPE4b which is provided in plurality and lengthwise extends from the fourth plate-shaped portion SPE4a. That is, the third and fourth subpixel electrodes SPE3 and SPE4 may have the same shape as that of the first and second subpixel electrodes SPE1 and SPE2.

The third plate-shaped portion SPE3a may overlap a third slit portion SLT3 which will be described later, and the fourth plate-shaped portion SPE4a may overlap a fourth slit portion SLT4 which will be described later. At least one of the third branch portions SPE3b may be connected to at least one of the fourth branch portions SPE4b. In addition, at least one of the third branch portions SPE3b may be connected to at least one of the second branch portions SPE2b. Referring to FIG. 1, the second branch portions SPE2b may respectively be connected to the third branch portions SPE3b in b3 and b4 areas, and the third branch portions SPE3b may respectively be connected to the fourth branch portions SPE4b in b5 and b6 areas.

Therefore, the first through fourth subpixel electrodes SPE1 through SPE4 are connected to one another. That is, the pixel electrode PE may include two or more subpixel electrodes, such as two pairs of subpixel electrodes, and all the subpixel electrodes included in the pixel electrode PE may be connected to one another.

The common electrode CE (see FIG. 2) may include two or more slit portions. The common electrode CE may be plate-shaped in areas thereof excluding the slit portions.

Referring to FIG. 1, the common electrode CE may define or include the first and second slit portions SLT1 and SLT2. According to an exemplary embodiment, each of the first slit portions SLT1 and the second slit portion SLT2 may be cross-shaped. The first slit portion SLT1 may overlap the first plate-shaped portion SPE1a, and the second slit portion SLT2 may overlap the second plate-shaped portion SPE2a.

The first slit portion SLT1 is connected to and continuous with the second slit portion SLT2. More specifically, the first slit portion SLT1 may be connected to and meet the second slit portion SLT2 at a first connecting portion or area a1. The first connecting portion a1 may be located between the first subpixel electrode SPE1 and the second subpixel electrode SPE2. In addition, the first connecting portion a1 may not overlap each of the first subpixel electrode SPE1 and the second subpixel electrode SPE2. That is, as long as the first connecting portion a1 does not overlap each of the first subpixel electrode SPE1 and the second subpixel electrode SPE2, the position, shape and size of the first connecting portion a1 are not limited to those illustrated in FIG. 1.

The common electrode CE may further define or include the third slit portion SLT3 and the fourth slit portion SLT4. According to an exemplary embodiment, each of the third slit portion SLT3 and the fourth slit portion SLT4 may be cross-shaped. The third slit portion SLT3 may overlap the third plate-shaped portion SPE3a, and the fourth slit portion SLT4 may overlap the fourth plate-shaped portion SPE4a.

The third slit portion SLT3 may be connected to both the second and fourth slit portions SLT2 and SLT4. Consequently, all of the first through fourth slit portions SLT1 through SLT4 may be connected to one another to form a single, continuous slit portion. That is, the common electrode CE may include two or more individual slit portions, and all the slit portions included in the common electrode CE may be connected to one another to form a single, continuous slit portion thereof.

The first subpixel electrode SPE1, the second subpixel electrode SPE2, the first slit portion SLT1 and the second slit portion SLT2 will be described in greater detail later with reference to FIGS. 4 through 6B.

Figure 2:
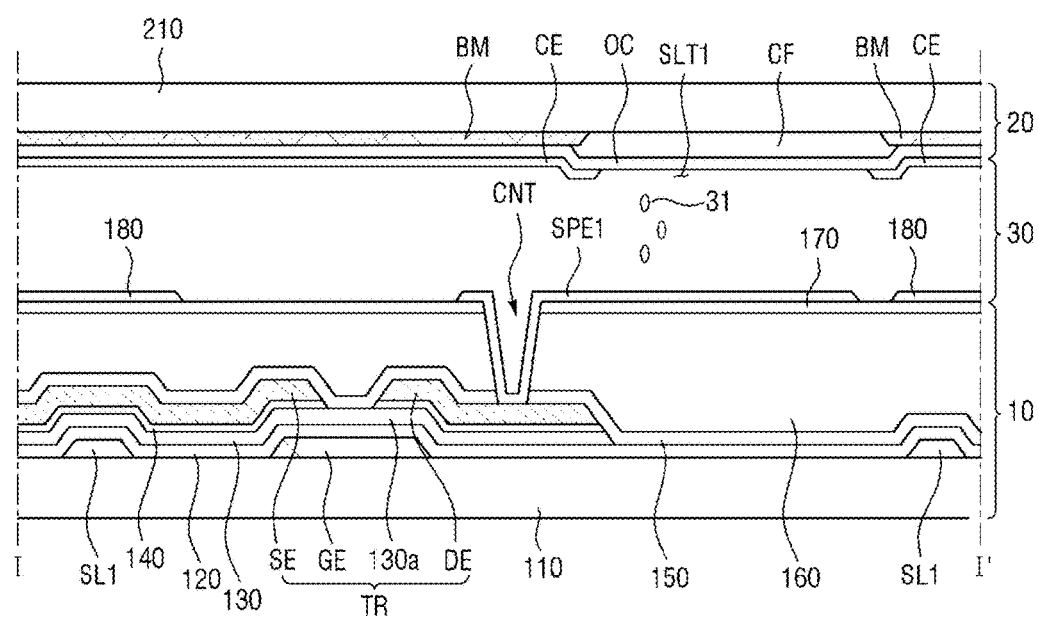
FIG. 2 is a cross-sectional view taken along line I-I' of FIG. 1.

The pixel portion PX may further include a liquid crystal capacitor formed between the pixel electrode PE and the common electrode CE (see FIG. 2). The liquid crystal capacitor is charged with a difference between a voltage provided to the pixel electrode PE and a voltage provided to the common electrode CE.

The first scan line SL1, the second scan line SL2, the first data line DL1, the black matrix BM and the semiconductor layer 130 will now be described with reference to FIGS. 1 through 3.

The first scan line SL1, the second scan line SL2 and the first data line DL1 respectively define a length thereof which is larger than a width thereof. Referring to FIG. 1, a length of the first and second scan lines SL1 and SL2 is extended in the first direction d1 while a length of the data line DL1 is extended in the second direction d2.

FIG. 2 is a cross-sectional view taken along line I-I' of FIG. 1. FIG. 3 is a cross-sectional view taken along line II-II" of FIG. 1.

Figure 3:
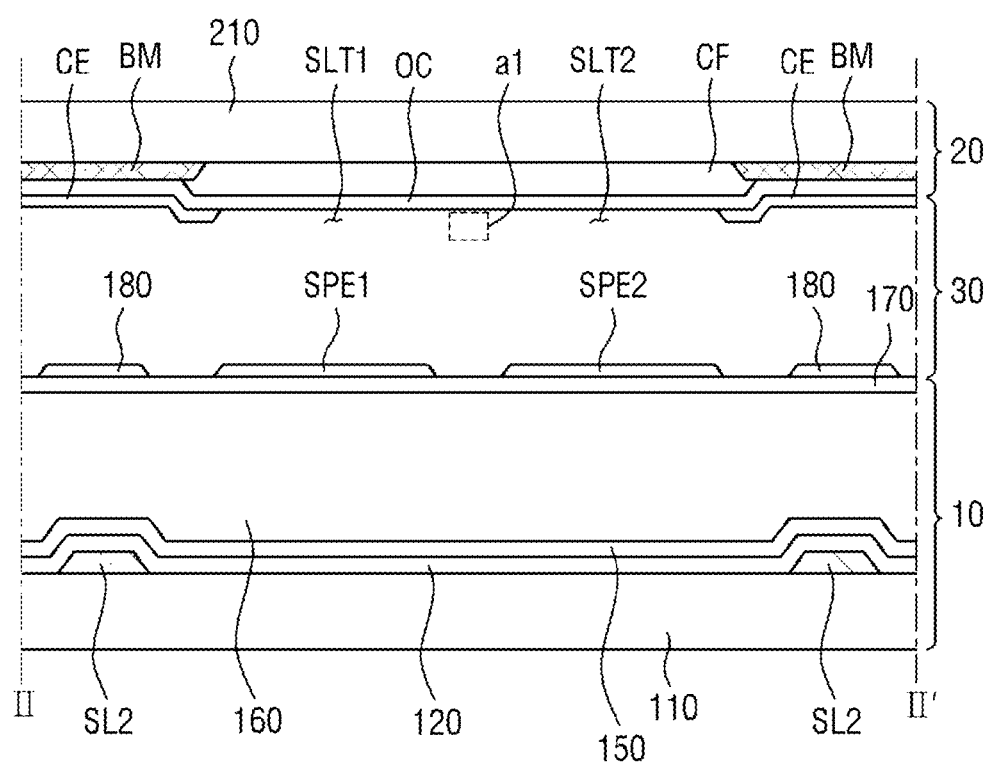
FIG. 3 is a cross-sectional view taken along line II-II" of FIG. 1.

Referring to FIGS. 1 through 3, a lower display panel 10 and an upper display panel 20 may be bonded together by sealing the two display panels together. The lower display panel 10 may be placed to face the upper display panel 20, and a liquid crystal layer 30 having a plurality of liquid crystal molecules 31 may be interposed between the lower display panel 10 and the upper display panel 20.

First, the lower display panel 10 will be described below.

The first scan line SL1 and the second scan line SL2 may be disposed on a lower substrate 110. The lower substrate 110 may be a transparent glass substrate, a plastic substrate, etc. according to an exemplary embodiment.

The first and second scan lines SL1 and SL2 may define a width thereof and a length thereof which is larger than the width and extends on the lower substrate 110 along the first direction d1. However, the direction in which the first and second scan lines SL1 and SL2 lengthwise extend is not limited to the first direction d1 and can vary according to the direction in which the first and second subpixel electrodes SPE1 and SPE2 are disposed adjacent to each other.

The gate electrode GE is disposed on the lower substrate 110 and connected to or extended from the first scan line SL1. The gate electrode GE may be disposed in the same layer or formed from a same material layer as the first and second scan lines SL1 and SL2, among layers disposed on the lower substrate 110.

Each of the gate electrode GE, the first scan line SL1 and the second scan line SL3 may be a single layer, a double layer or a triple layer structure including or made of one conductive metal, at least two conductive metals or three conductive metals selected from aluminum (Al), copper (Cu), molybdenum (Mo), chrome (Cr), titanium (Ti), tungsten (W), molybdenum tungsten (MoW), molybdenum titanium (MoTi), and copper/molybdenum titanium (Cu/MoTi).

A gate insulating layer 120 may be disposed on the gate electrode GE, the first scan line SL1 and the second scan line SL2. The gate insulating layer 120 may include or be made of silicon nitride (SiNx) or silicon oxide (SiOx) according to an exemplary embodiment of the invention. The gate insulating layer 120 may also have a multilayer structure including or made of at least two insulating layers with different physical characteristics from each other.

The semiconductor layer 130 may be disposed on the gate insulating layer 120. The semiconductor layer 130 may include a semiconductor pattern 130a that forms a channel region of the switching device TR. The semiconductor layer 130 may include an oxide semiconductor. The semiconductor layer 130 may include or be made of one oxide semiconductor selected from In—Ga-Zinc-Oxide (IGZO), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$. In another exemplary embodiment, the semiconductor layer 130 may include or be made of amorphous silicon, polycrystalline silicon, etc.

An ohmic contact layer 140 may be disposed on the semiconductor layer 130. The ohmic contact layer 140 may include or be made of a material such as n+ hydrogenated amorphous silicon heavily doped with an n-type impurity such as phosphorous or may include or be made of silicide. When the semiconductor layer 130 includes or is made of an oxide semiconductor, the ohmic contact layer 140 may be omitted.

The first data line DL1, the source electrode SE and the drain electrode DE may be disposed on the gate insulating layer 120 and the ohmic contact layer 140. The first data line DL1 may define a width thereof and a length thereof which is larger than the width and extends on the lower substrate 110 along the second direction d2. However, the direction in which the first data line DL1 extends is not limited to the second direction d2 and can vary according to the direction in which the first and second subpixel electrodes SPE1 and SPE2 are disposed adjacent to each other.

Each of the first data line DL1, the source electrode SE and the drain electrode DE may be a single layer, a double layer or a triple layer structure including or made of one conductive metal, at least two conductive metals or three conductive metals selected from aluminum (Al), copper (Cu), molybdenum (Mo), chrome (Cr), titanium (Ti), tungsten (W), molybdenum tungsten (MoW), molybdenum titanium (MoTi), and copper/molybdenum titanium (Cu/MoTi). However, the invention is not limited thereto, and each of the first data line DL1, the source electrode SE and the drain electrode DE can include or be made of various metals or conductors.

In an exemplary embodiment of forming the LCD, the first data line DL1, the source electrode SE and the drain electrode DE may be formed at the same time as the semiconductor layer 130 and the ohmic contact layer 140 by the same mask process according to the invention. The first data line DL1, the source electrode SE and the drain electrode DE may have substantially the same planar shape as the semiconductor layer 130 except for the semiconductor pattern 130a.

The source electrode SE and the drain electrode DE form the switching device TR together with the semiconductor pattern 130a and the gate electrode GE. The source electrode SE of the switching device TR may be connected to or extended from the first data line DL1. The drain electrode DE of the switching device TR may be connected to the first subpixel electrode SPE1 at a contact hole CNT. The source electrode SE of the switching device TR is disposed in the same layer as the drain electrode DE of the switching device TR and separated from the drain electrode DE of the switching device TR by a predetermined distance. The channel region of the switching device TR may be formed between the source electrode SE and the drain electrode DE according to a scan signal provided through the gate electrode GE. The first data line DL1, the source electrode SE and the drain electrode DE may be disposed in the same layer or formed from a same material layer as each other, among layers disposed on the lower substrate 110.

A first passivation layer 150 may be disposed on the first data line DL1, the source electrode SE and the drain electrode DE. The first passivation layer 150 may include or be made of an inorganic insulating material such as silicon nitride or silicon oxide according to an exemplary embodiment of the invention. The first passivation layer 150 may reduce or effectively prevent a pigment of an organic insulating layer 160, which will be described later, from flowing into the semiconductor pattern 130a.

The organic insulating layer 160 may be disposed on the first passivation layer 150. The organic insulating layer 160 may include an organic material having superior planarization characteristics and photosensitivity. In exemplary embodiments of the LCD, The organic insulating layer 160 is optional.

A second passivation layer 170 may be disposed on the organic insulating layer 160. The second passivation layer 170 may include or be made of an inorganic insulating material such as silicon nitride or silicon oxide according to an exemplary embodiment.

The pixel electrode PE may be disposed on the second passivation layer 170. The pixel electrode PE may include the first through fourth subpixel electrodes SPE1 through SPE4. The first through fourth subpixel electrodes SPE1 through SPE4 overlap the common electrode CE which will be described later. The first through fourth subpixel electrodes SPE1 through SPE4 which overlap the common electrode CE may form a fringe field, thus causing the liquid crystal molecules 310 to rotate in a certain direction.

The first subpixel electrode SPE1 may be connected at the contact hole CNT to the drain electrode DE of the switching device TR which is exposed by the contact hole CNT. The first subpixel electrode SPE1 is connected to all of the second through fourth subpixel electrodes SPE2 through SPE4 as described above with reference to FIG. 1. Consequently, an entirety of the pixel electrode PE may receive a data signal from the first data line DL1 through the single one switching device TR contacted with the first subpixel electrode SPE1. The pixel electrode PE may include or be made of a transparent conductive material such as indium tin oxide ("ITO") or indium zinc oxide ("IZO") or a reflective metal such as aluminum, silver, chrome or an alloy thereof.

A shielding electrode 180 may be disposed in the same layer or formed from a same material layer as the pixel electrode PE, among layers disposed on the lower substrate 110. The shielding electrode 180 may include or be made of a transparent conductive material such as ITO or IZO or a reflective metal such as aluminum, silver, chrome or an alloy thereof. According to an exemplary embodiment, the shielding electrode 180 may vertically (e.g., perpendicularly) overlap the first scan line SL1, the second scan line SL and the first data line DL1 disposed on the lower substrate 110. That is, lengths of the first scan line SL1, the second scan line SL and the first data line DL1 may overlap each other in the top plan view. Accordingly, the shielding electrode 180 can reduce or effectively prevent leakage of light due to electric coupling between the first and second scan lines SL1 and SL2, with respect to the pixel electrode PE.

Although not illustrated in the drawings, a first alignment layer may be disposed on the pixel electrode PE. The first alignment layer may include or be made of, e.g., polyimide.

Next, the upper display panel 20 will be described.

An upper substrate 210 may be placed to face the lower substrate 110. The upper substrate 210 may include or be made of transparent glass or plastic. In an exemplary embodiment of the invention, the upper substrate 210 may include or be made of the same material as the lower substrate 110.

The black matrix BM may be disposed on the upper substrate 210. The black matrix BM disposed on the upper substrate 210 can block light from transmitting through areas other than a pixel area of the pixel region PX. According to an exemplary embodiment, the black matrix BM may include or be made of a metal material including organic matter or chrome.

A color filter CF may be disposed on the upper substrate 210 and the black matrix BM. The color filter CF may display one of three primary colors, e.g., red, green and blue, but the invention is not limited thereto. The color filter CF in each pixel region PX may include or be made of a material of a different color from the color of a material that forms the color filter CF in an adjacent pixel region PX.

An overcoat layer OC may be disposed on the color filter CF. The overcoat layer OC may include or be made of an insulating material. In exemplary embodiments, the overcoat layer OC can be omitted.

The common electrode CE may be disposed on the overcoat layer OC. The common electrode CE may overlap the pixel electrode PE. The common electrode CE may include the first through fourth slit portions SLT1 through SLT4 which overlap the first through fourth subpixel electrodes SPE1 through SPE4 of the pixel electrode PE, respectively. The common electrode CE may include or be made of a transparent conductive material such as ITO or IZO or a reflective metal such as aluminum, silver, chrome or an alloy thereof.

The common electrode CE and the pixel electrode PE will be described in greater detail with reference to FIGS. 4 through 6B.

Although not illustrated in the drawings, a second alignment layer (not illustrated) may be disposed or formed on the common electrode CE. The second alignment layer may include or be made of, e.g., polyimide.

Figure 4:
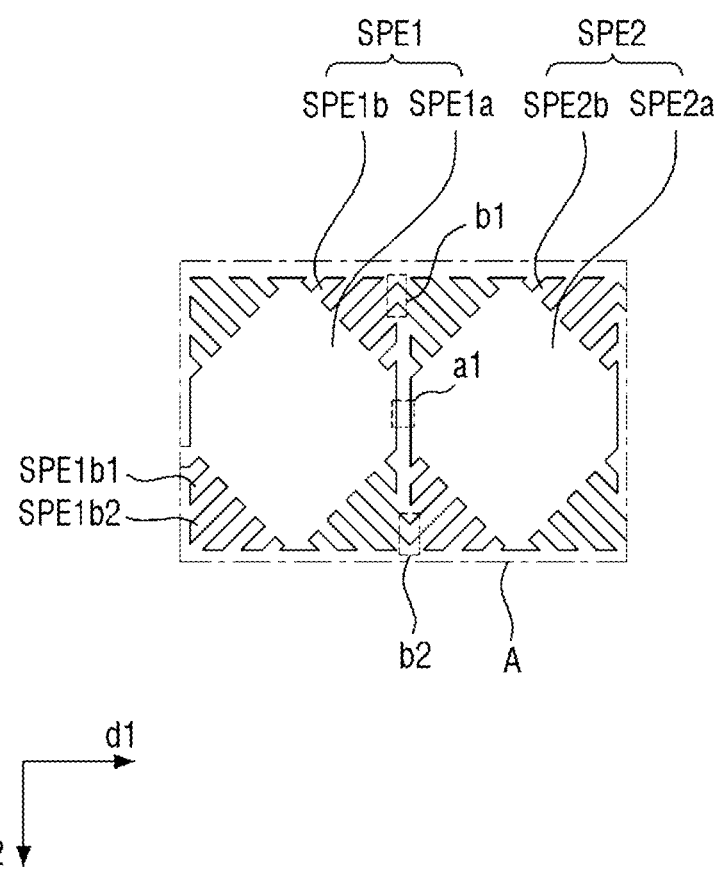
FIG. 4 is a top plan view of an exemplary embodiment of a portion of a pixel electrode which is disposed in an A area of the pixel portion of FIG. 1.
Figure 5:
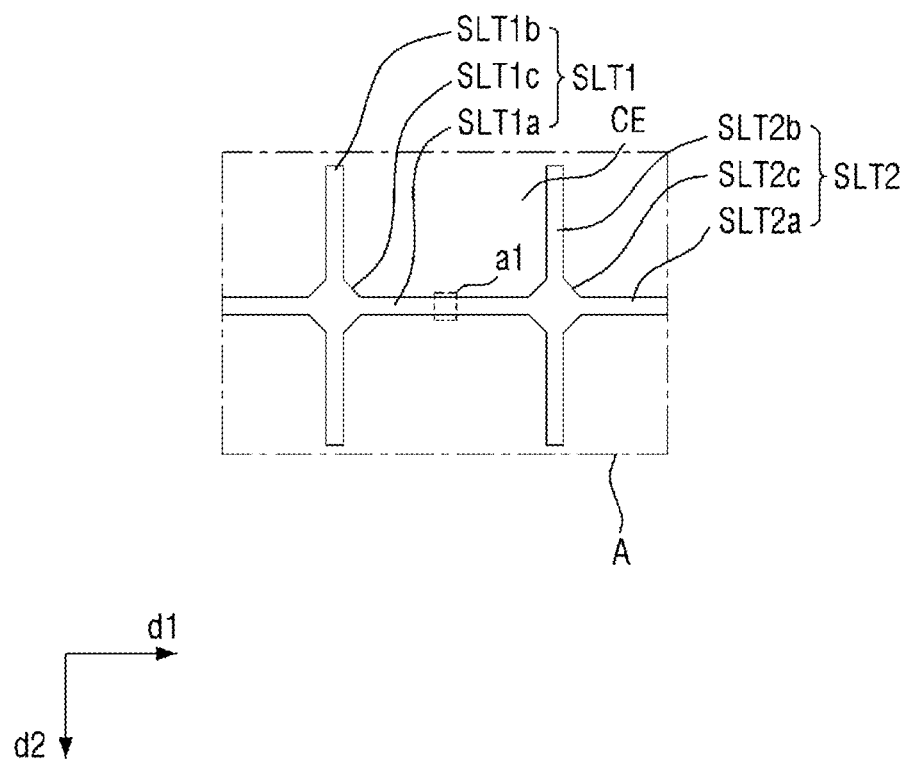
FIG. 5 is a top plan view of an exemplary embodiment of a portion of a common electrode which is disposed in the A area of the pixel portion of FIG. 1.
Figure 6A:
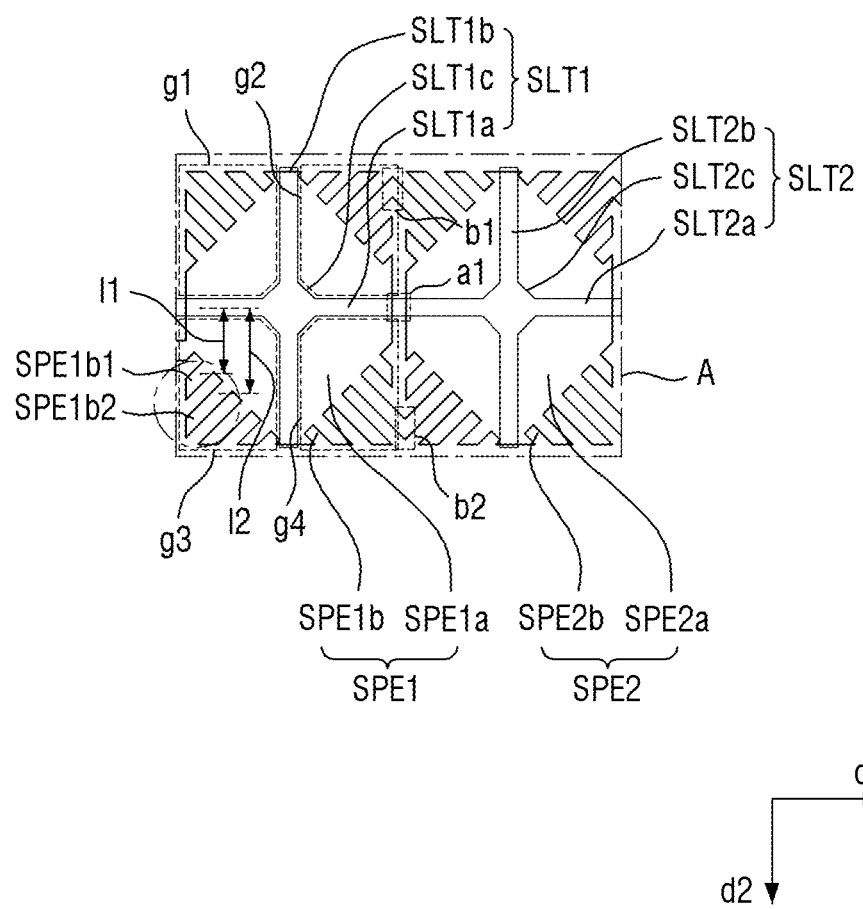
FIG. 6A is a top plan view of both the portions of the pixel electrode and the common electrode of FIGS. 4 and 4 which are disposed in the A area of the pixel portion of FIG. 1.
Figure 6B:
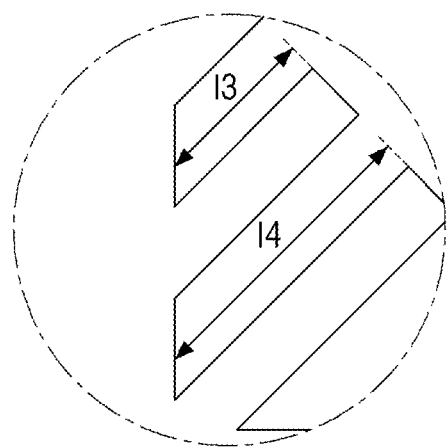
FIG. 6B is an enlarged edge portion of the pixel electrode in FIG. 6A.

FIG. 4 is a top plan view of an exemplary embodiment of a portion of the pixel electrode PE which is disposed in an A area of the pixel portion PX of FIG. 1. FIG. 5 is a top plan view of an exemplary embodiment of a portion of the common electrode CE which is disposed in the A area of the pixel portion PX of FIG. 1. FIG. 6A is a top plan view of both the portions of the pixel electrode PE and the common electrode CE of FIGS. 4 and 4 which are disposed in the A area of the pixel portion of FIG. 1, and FIG. 6B is an enlarged edge portion of the pixel electrode in FIG. 6A. Here, where the pixel electrode PE includes the first and second subpixel electrodes SPE1 and SPE2 and the common electrode CE includes the first and second slit portions SLT1 and SLT2 will be described as an example. In addition, any redundant description made above with reference to FIGS. 1 through 3 will be omitted.

Referring to FIGS. 4 through 6B, the pixel electrode PE may include the first and second subpixel electrodes SPE1 and SPE2 disposed in the A area. That is, the pixel electrode PE may be divided into at least two domains by the subpixel electrodes thereof. In FIG. 4, reference character a1 indicates an area in which the first connecting portion a1 of the common electrode CE described above is disposed.

The first subpixel electrode SPE1 may include the first plate-shaped portion SPE1a and the first branch portions SPE1b which lengthwise extend from the first plate-shaped portion SPE1a. According to an exemplary embodiment, the first plate-shaped portion SPE1a may be rhombic in planar shape. The first branch portions SPE1b may lengthwise extend from each side of a rhombus toward the outer periphery of the first subpixel electrode SPE1. The second subpixel electrode SPE2 may include the second plate-shaped portion SPE2a and the second branch portions SPE2b which lengthwise extend from the second plate-shaped portion SPE2a. That is, the second subpixel electrode SPE2 may have the same shape as the first subpixel electrode SPE1.

At least one of the first branch portions SPE1b may be connected to at least one of the second branch portions SPE2b. Referring to FIG. 4, the first subpixel electrode SPE1 may be connected to the second subpixel electrode SPE2 in the b1 and b2 areas. Accordingly, the first subpixel electrode SPE1 is electrically connected to the second subpixel electrode SPE2.

However, the first subpixel electrode SPE1 may not be connected to the second subpixel electrode SPE2 in an area that overlaps the first connecting area a1 of the common electrode CE. That is, the first subpixel electrode SPE1 may be connected to the second subpixel electrode SPE2 at locations (e.g., the b1 and b2 areas) other than the area in which the first connecting area a1 of the common electrode CE is disposed.

The common electrode CE may include the first and second slit portions SLT1 and SLT2 disposed in the A area. The first slit portion SLT1 may overlap the first subpixel electrode SPE1, and the second slit portion SLT2 may overlap the second subpixel electrode SPE2.

The first slit portion SLT1 may include a first horizontal portion SLT1a lengthwise extending in the first direction d1 and a first vertical portion SLT1b lengthwise extending in the second direction d2. In addition, the first horizontal portion SLT1a may intersect the first vertical portion SLT1b. Accordingly, the first slit portion SLT1 may further include a first central portion SLT1c defined or formed at an intersection of the first horizontal portion SLT1a and the first vertical portion SLT1b. In FIGS. 4 through 6A, the first central portion SLT1c is located at a center of the cross-shaped first slit portion SLT1, but the invention is not limited thereto. In addition, the first central portion SLT1c may have a polygonal structure defined with four straight sides which are located in first through fourth areas g1 through g4 of the pixel electrode PE (see FIG. 6A) defined by the cross-shaped first slit portion SLT1. That is, the first central portion SLT1c may be rhombic according to an exemplary embodiment of the invention. The first central portion SLT1c of the common electrode CE may overlap the first plate-shaped portion SPE1a of the pixel electrode PE.

The second slit portion SLT2 may include a second horizontal portion SLT2a lengthwise extending in the first direction d1 and a second vertical portion SLT2b lengthwise extending in the second direction d2. In addition, the second horizontal portion SLT2a may intersect the second vertical portion SLT2b. The second slit portion SLT2 may further include a second central portion SLT2c located at an intersection of the second horizontal portion SLT2a and the second vertical portion SLT2b. Like the first central portion SLT1c, the second central portion SLT2c may be shaped like a rhombus defined by four sides according to an exemplary embodiment. The second central portion SLT2c of the common electrode CE may overlap the second plate-shaped portion SPE2a of the pixel electrode PE.

The first slit portion SLT1 may be connected to the second slit portion SLT2 by the first connecting portion a1. The first connecting portion a1 may be located between the first horizontal portion SLT1a and the second horizontal portion SLT2a. The first slit portion SLT1 may be symmetrical to the second slit portion SLT2 with respect to the first connecting portion a1.

Referring to FIGS. 6A and 6B, the first branch portions SPE1b may include first and second micro-branch portions SPE1b1 and SPE1b2. The second branch portions SPE2b may similarly include micro-branch portions, but only the first branch portions SPE1b will be described as an example.

The first and second micro-branch portions SPE1b1 and SPE1b2 of the pixel electrode PE may be located in one of the first through fourth areas g1 through g4 of the pixel electrode PE. Here, the first through fourth areas g1 through g4 are areas of the first subpixel electrode SPE1 which are defined by the first slit portion SLT1 of the common electrode CE. In addition, an exemplary embodiment where the first and second micro-branch portions SPE1b1 and SPE1b2 are disposed in the third area g3 of the first subpixel electrode SPE1 will be described herein with reference to FIGS. 6A and 6B.

The first micro-branch portion SPE1b1 may be relatively closer to the first horizontal portion SLT1a of the first slit portion SLT1 than the second micro-branch portion SPE1b2, with respect to the second direction d2. More specifically, a minimum distance l1 from the first micro-branch portion SPE1b1 to the first horizontal portion SLT1a may be smaller than a minimum distance l2 from the second micro-branch portion SPE1b2 to the first horizontal portion SLT1a. A length l4 of the second micro-branch portion SPE1b2 may be greater than a length l3 of the first micro-branch portion SPE1b1. That is, among the first branch portions SPE1b, a branch portion (e.g., SPE1b1) which is relatively close to the first horizontal portion SLT1a or the first central portion SLT1c of the first slit portion SLT1 may have a smaller length l3 than the length l4 of a branch portions (e.g., SPE1b2) which is relatively far away from the first horizontal portion SLT1a or the first central portion SLT1c of the first slit portion SLT1.

Figure 7A:
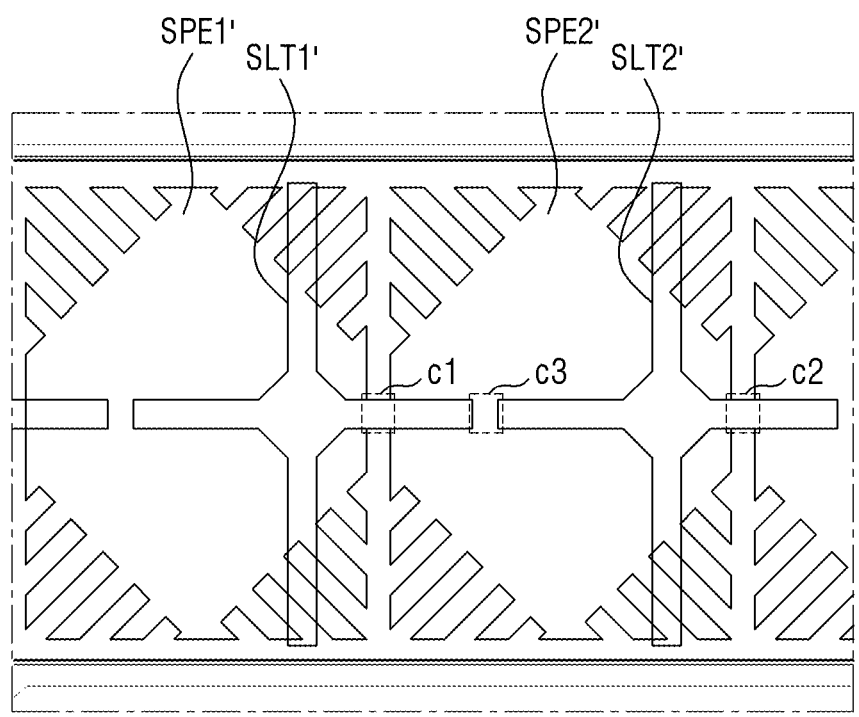
FIG. 7A is a top plan view of a pixel portion of an LCD and FIG. 7B illustrates a texture phenomenon of the LCD according to a comparative example.
Figure 7B:
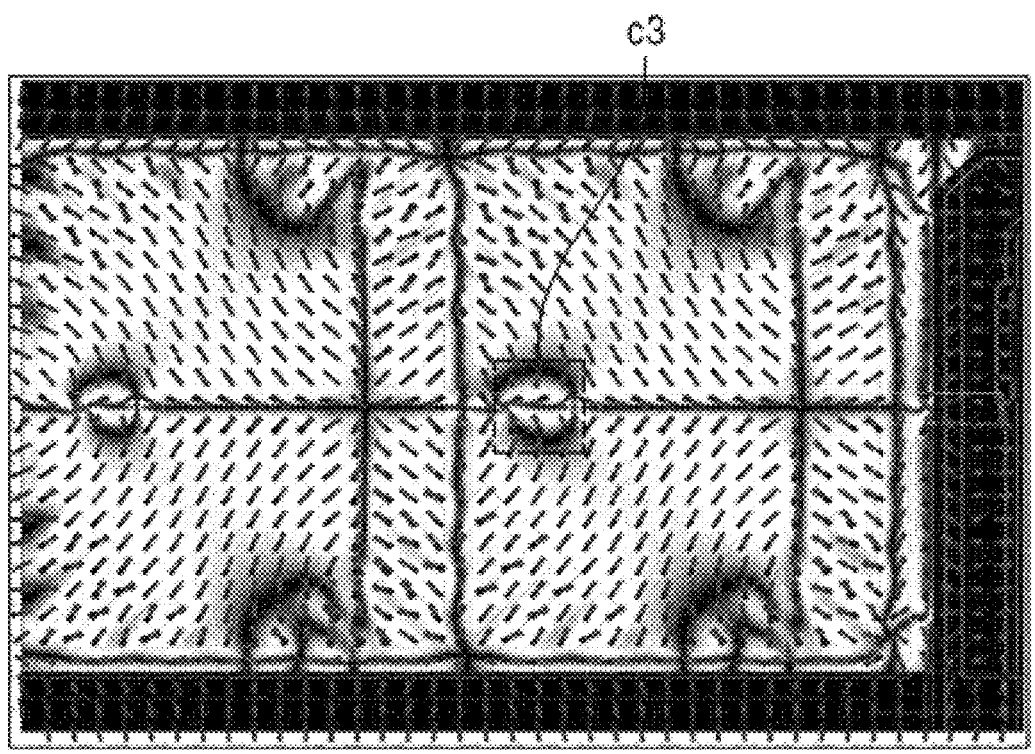
Figure 8A:
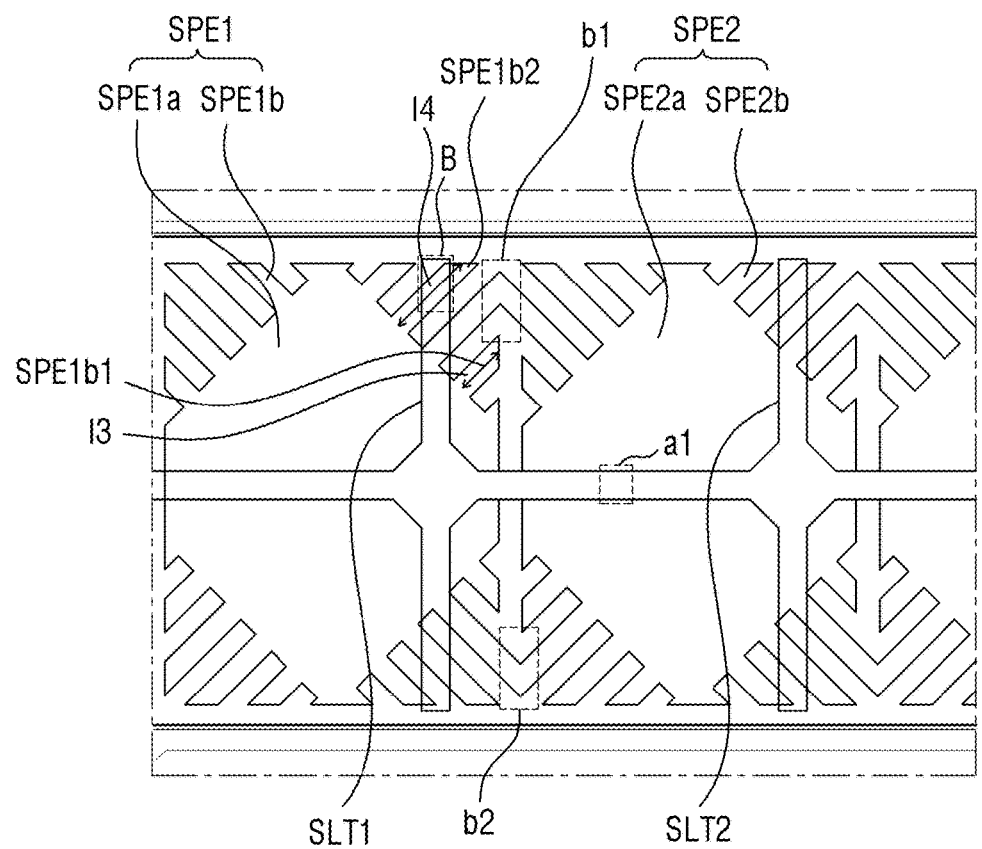
FIG. 8A is a top plan view of an exemplary embodiment of a pixel portion of an LCD of FIG. 1
Figure 8B:
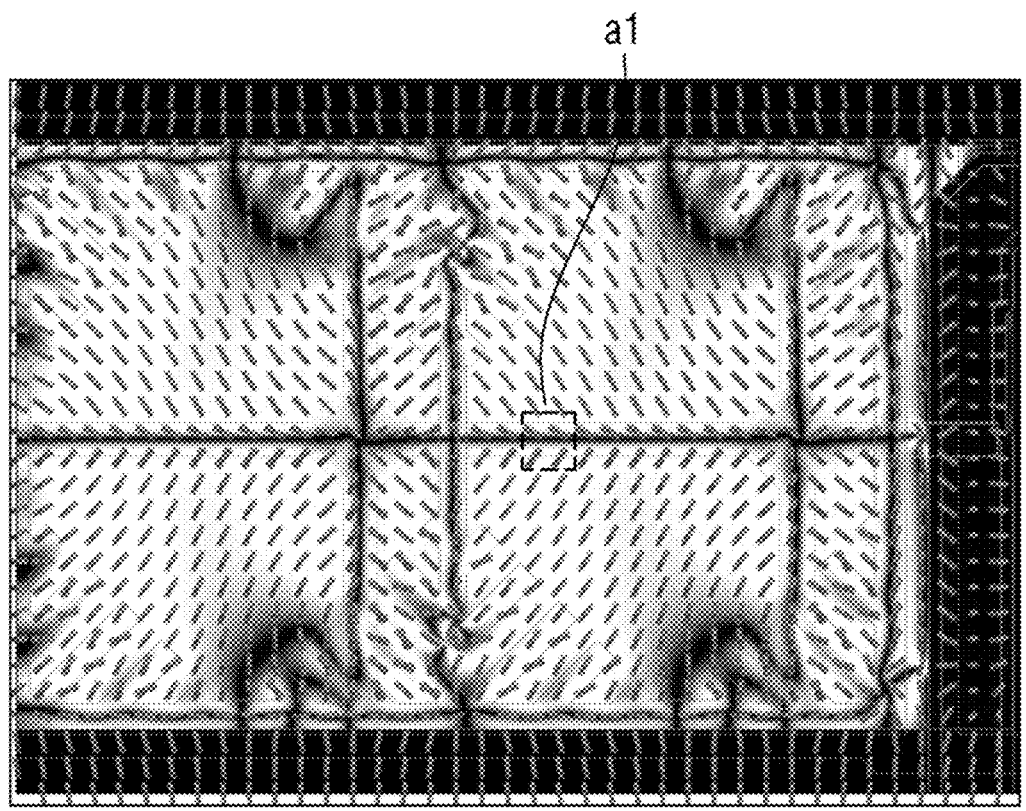
FIG. 8B illustrates a texture phenomenon of the LCD according to the invention.

FIG. 7A is a top plan view of a pixel portion of an LCD and FIG. 7B illustrates a texture phenomenon of the LCD according to a comparative example. FIG. 8A is a top plan view of an exemplary embodiment of a pixel portion of an LCD of FIG. 1 and FIG. 8B illustrates a texture phenomenon of the LCD according to the invention. For ease of description, components of the LCD according to the comparative example which are identical to those of the LCD according to the exemplary embodiment of FIG. 1 will be referred to by the same names and identified by different reference characters.

Referring to FIG. 7A, the LCD according to the comparative example may include a first subpixel electrode SPE1', a second subpixel electrode SPE2' and a common electrode (not illustrated). The common electrode (not illustrated) may include a first slit portion SLT1' and a second slit portion SLT2'.

The first slit portion SLT1' is not connected to (e.g., is disconnected from) the second slit portion SLT2'. That is, referring to a c3 area, the first slit portion SLT1' and the second slit portion SLT2' are not connected to each other. On the other hand, the first subpixel electrode SPE1' is connected to the second subpixel electrode SPE2' in a c1 area. In addition, the second subpixel electrode SPE2' is connected to a neighboring subpixel electrode in a c2 area. Here, the first and second subpixel electrodes SPE1' and SPE2' are disposed in a different display panel from a display panel in which the common electrode is disposed.

The display panel in which the first and second subpixel electrodes SPE1' and SPE2' are disposed may be bonded to the display panel in which the common electrode is disposed. In this process, if an overlay shift occurs as illustrated in FIG. 7A, a misalignment may result. As the misalignment, for example, the first slit portion SLT1' may not overlap a center of the first subpixel electrode SPE1' as illustrated in FIG. 7A.

The misalignment may reduce the transmittance of a display device including the display panels bonded to each other. As an example, a misalignment of about 12 micrometers (μm) to about 15 μm may lead to a reduction of approximately 20% in transmittance compared with a display device without a misalignment. In addition, referring to FIG. 7B, a texture phenomenon may occur in the c3 area, that is, in an area in which the common electrode overlaps one of the first and second subpixel electrodes SPE1' and SPE2'.

In contrast, referring to FIGS. 8A and 8B, the exemplary embodiment of the LCD according to the invention can have a reduced texture phenomenon despite the occurrence of a misalignment. More specifically, referring to FIG. 8A, even when a misalignment occurs, the texture phenomenon in the area in which the first connecting area a1 is located can be reduced as illustrated in FIG. 8B because the first slit portion SLT1 and the second slit portion SLT2 are connected to each other by the first connecting portion a1.

Among the first branch portions SPE1b, a branch portion (e.g., SPE1b1) which is relatively close to the first horizontal portion SLT1a or the first central portion SLT1c of the first slit portion SLT1 has a smaller length 13 than the length 14 of a branch portion (e.g., SPE1b2) which is relatively far away from the first horizontal portion SLT1a or the first central portion SLT1c of the first slit portion SLT1.

In addition, a reduction in the transmittance of the exemplary embodiment of the LCD in FIGS. 8A and 8B according to the invention can be reduced by approximately 7%.

This will now be described in greater detail with reference to the table below. The misalignment of the comparative example of FIGS. 7A and 7B can reduce overall transmittance of the LCD by approximately 20%. In contrast, the misalignment of the exemplary embodiment of FIGS. 8A and 8B can reduce the transmittance of the LCD by approximately 7%. That is, a reduction in the transmittance of the exemplary embodiment of the LCD according to the invention is smaller than that in the transmittance of the comparative example of the LCD.

TABLE

| Degree of align miss | Transmittance (%) | |
|---|---|---|
| (μm) | Comparative example | Exemplary embodiment |
| 0 | 100 | 99.1 |
| 16 | 82.7 | 92.1 |

Figure 9:
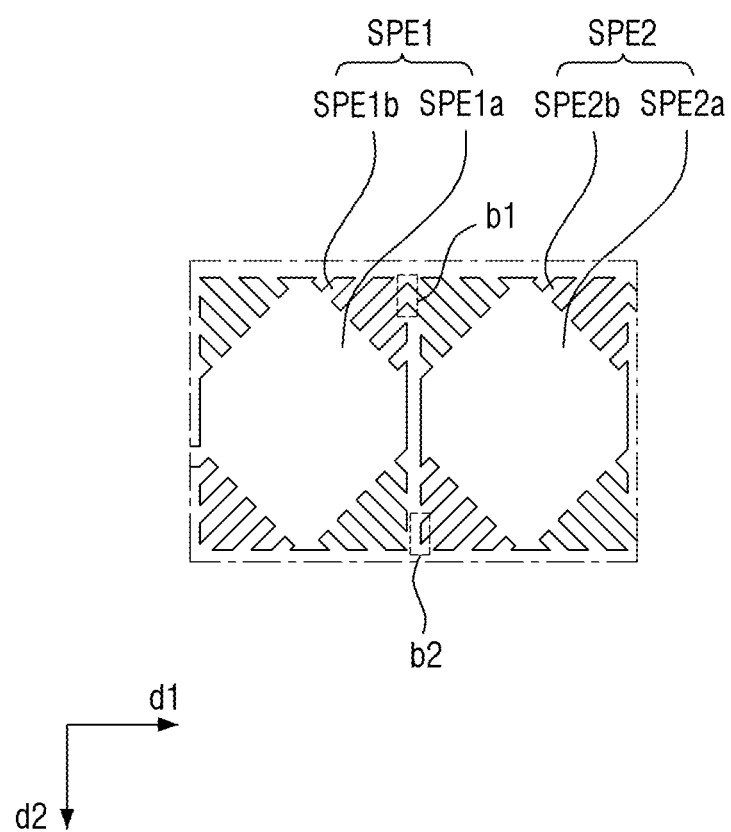
FIGS. 9 through 11 are top plan views of other exemplary embodiments of a portion of a pixel electrode which is disposed in the A area of the pixel portion of FIG. 1.
Figure 10:
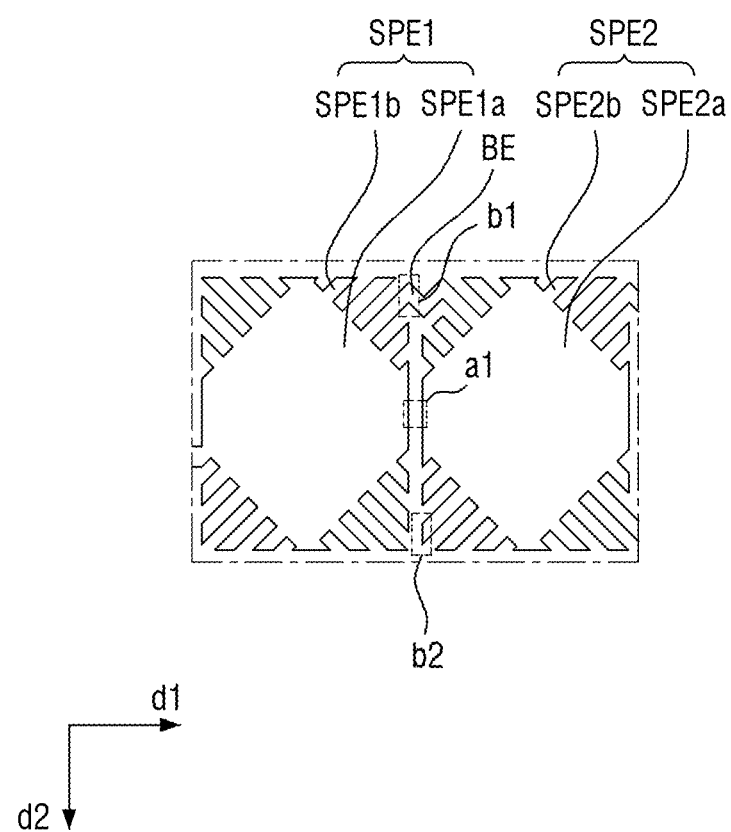
Figure 11:
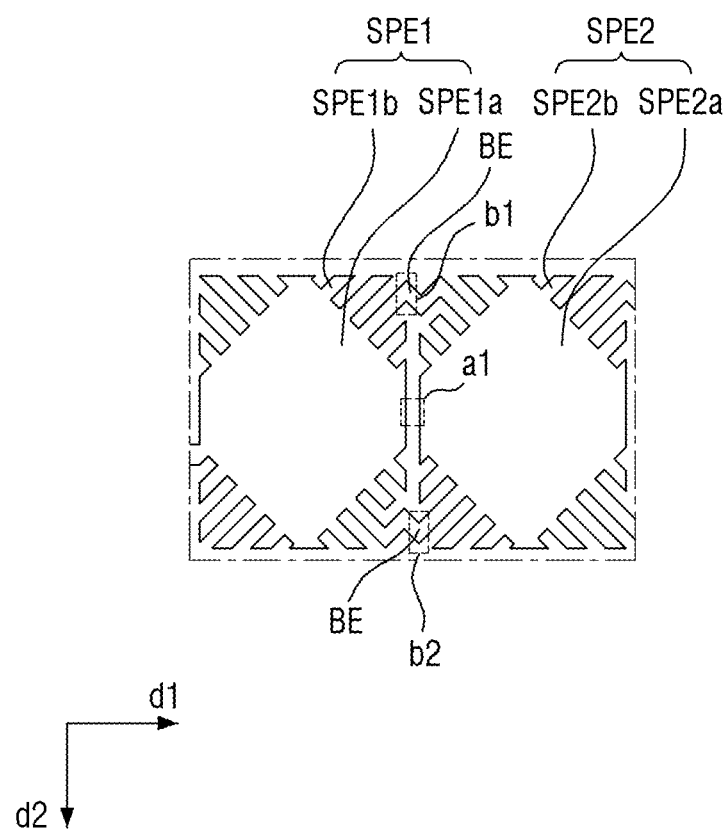

FIGS. 9 through 11 are top plan views of other exemplary embodiments of a portion of the pixel electrode PE which is disposed in the A area of the pixel portion PX of FIG. 1. Any redundant description made above with reference to FIGS. 1 through 6B will be omitted. In addition, the reference characters used in FIGS. 1 through 6B will be used for ease of description.

Referring to FIG. 9, at least one of a plurality of first branch portions SPE1b may be connected to at least one of a plurality of second branch portions SPE2b only in a b1 area. That is, the first branch portions SPE1b may not be connected to the second branch portions SPE2b in a b2 area.

The first and second branch portions SPE1b and SPE2b lengthwise extend in a single direction and are connected to each other at distal ends thereof, but the invention is not limited thereto.

In addition, while only one of the first branch portions SPE1b is connected to only one of the second branch portions SPE2b, as illustrated in FIG. 9, the invention is not limited thereto. That is, in alternative exemplary embodiments, one or more of the first branch portions SPE1b can be connected to one or more of the second branch portions SPE2b in the b1 area.

Referring to FIG. 10, at least one of a plurality of first branch portions SPE1b may be connected to at least one of a plurality of second branch portions SPE2b by at least one connecting electrode BE. The first and second branch portions SPE1b and SPE2b lengthwise extend in a single direction and are connected to each other by the connecting electrode BE.

In the example of FIG. 10, one of the first branch portions SPE1b may be connected to one of the second branch portions SPE2b by a connecting electrode BE in both a b1 area and a b2 area, but the invention is not limited thereto. The number of the connecting electrodes BE may vary according to the number of the first branch portions SPE1b which are connected to the second branch portions SPE2b.

The connecting electrode BE may include a bent portion. The connecting electrode BE may be bent to extend in multiple directions, as compared to the single-direction first and second branch portions SPE1b and SPE2b.

Opposing ends of the connecting electrode BE may contact distal ends of the single-direction first and second branch portions SPE1b and SPE2b. Alternatively, the first and second branch portions SPE1b and SPE2b may have multi-directional ends which are connected to each other as distal portions thereof, and these ends may collectively define the connecting electrode BE.

Referring to FIG. 11, at least one of a plurality of first branch portions SPE1b may be connected to at least one of a plurality of second branch portions SPE2b by at least one connecting electrode BE only in a b1 area. That is, the first branch portions SPE1b may not be connected to the second branch portions SPE2b in a b2 area.

FIGS. 12 through 15 are top plan views of other exemplary embodiments of a pixel portion PX in an LCD according to the invention.

Figure 12:
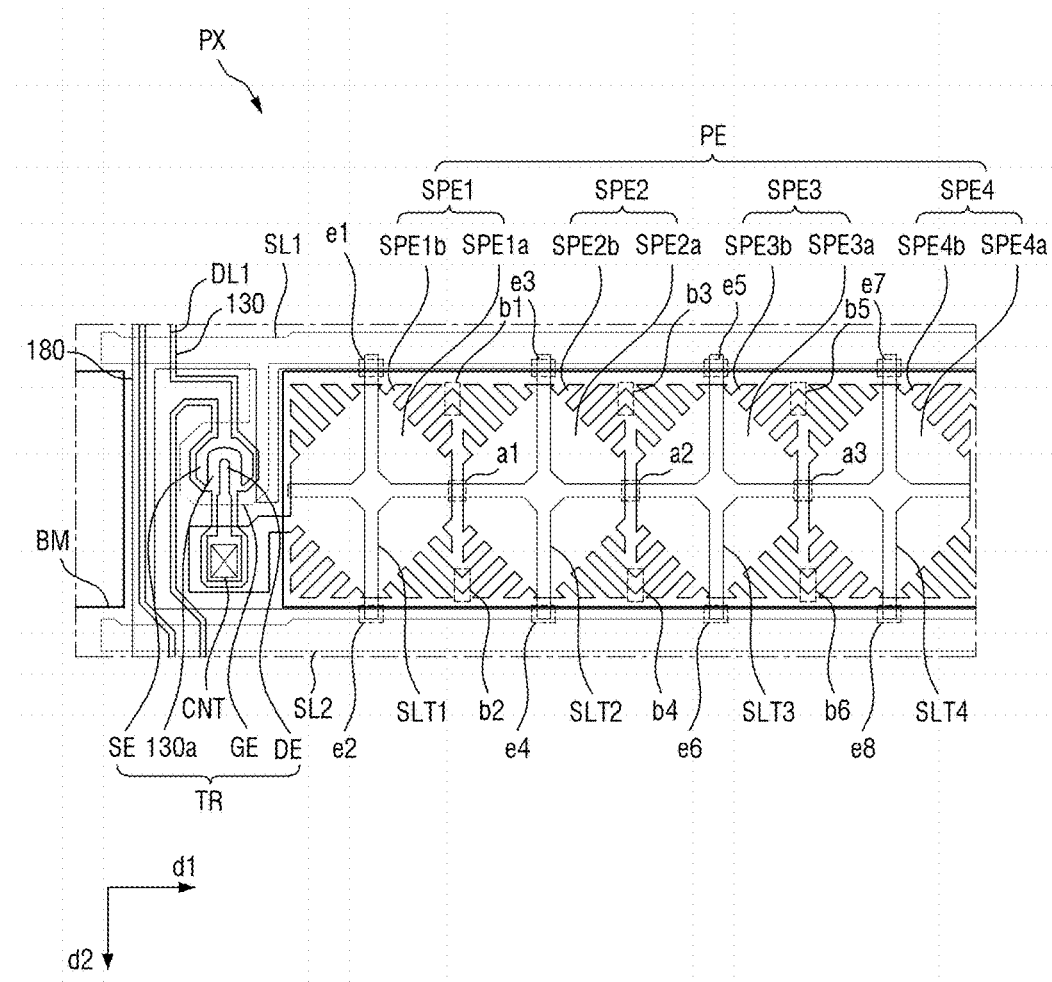
FIGS. 12 through 15 are top plan views of other exemplary embodiments of a pixel portion in an LCD according to the invention.

Referring to FIG. 12, a first slit portion SLT1 may further include a first overlapping portion e1 as a distal end thereof which overlaps a first scan line SL1 and a second overlapping portion e2 as a distal end thereof which overlaps a second scan line SL2. A second slit portion SLT2 may further include a third overlapping portion e3 as a distal end thereof which overlaps the first scan line SL1 and a fourth overlapping portion e4 as a distal end thereof which overlaps the second scan line SL2. A third slit portion SLT3 may further include a fifth overlapping portion e5 as a distal end thereof which overlaps the first scan line SL1 and a sixth overlapping portion e6 as a distal end thereof which overlaps the second scan line SL2. A fourth slit portion SLT4 may include a seventh overlapping portion e7 as a distal end thereof which overlaps the first scan line SL1 and an eighth overlapping portion e8 as a distal end thereof which overlaps the second scan line SL2.

Accordingly, by overlapping the slit portion of the common electrode CE with a signal line, a texture phenomenon caused by a misalignment that occurs in a second direction d2 or a direction opposite to the second direction d2 may be reduced or effectively prevented.

In exemplary embodiments, among a single vertical slit portion of the common electrode CE, both distal ends of the vertical slit portion do not necessarily overlap respective first and second scan lines SL1 and SL2. That is, one distal end of a single vertical slit portion can overlap only one among the first scan line SL1 and the second scan line SL2.

Figure 13:
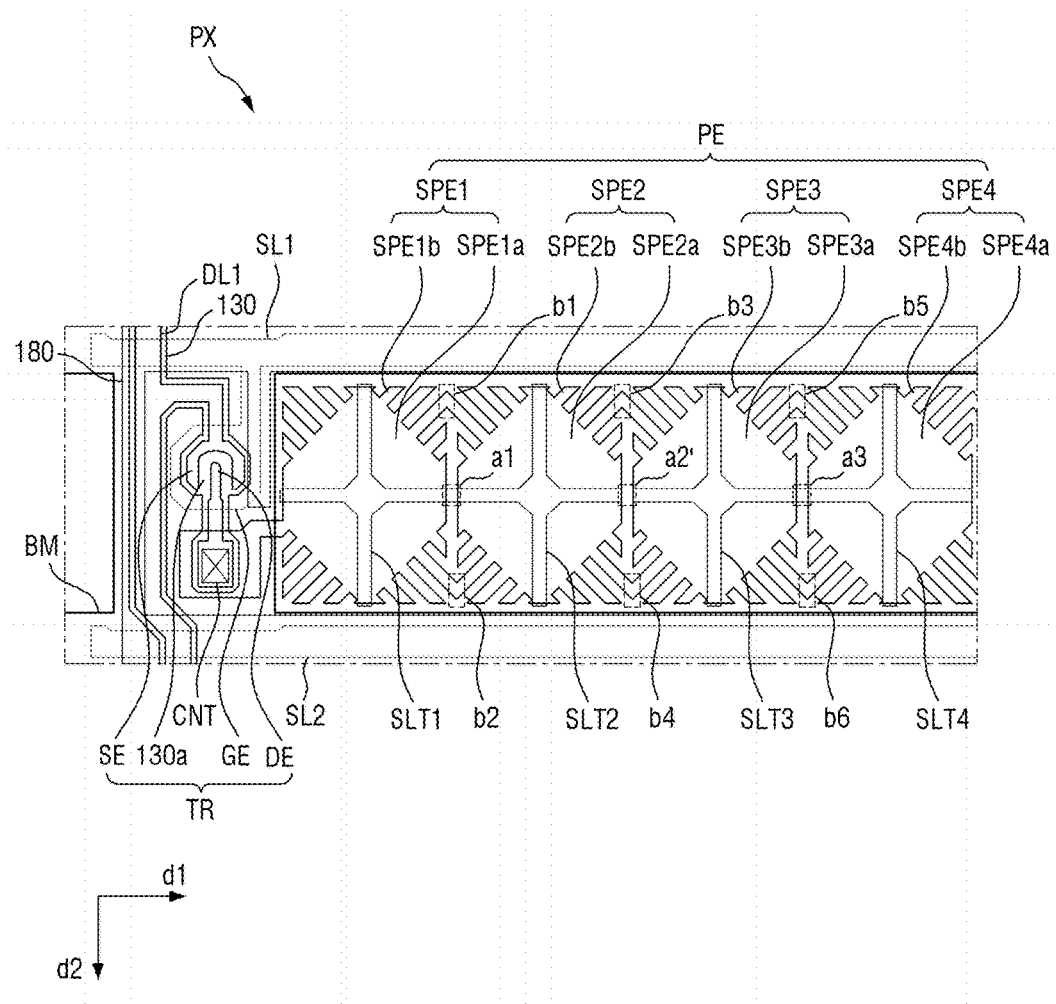

Referring to FIG. 13, a third slit portion SLT3 may be connected to a fourth slit portion SLT4 but may not be connected to a second slit portion SLT2. That is, the second slit portion SLT2 may not be connected to the third slit portion SLT3 at an a2' area, and the third slit portion SLT3 may be connected to or meet the fourth slit portion SLT4 at a third connecting portion or area a3.

Figure 14:
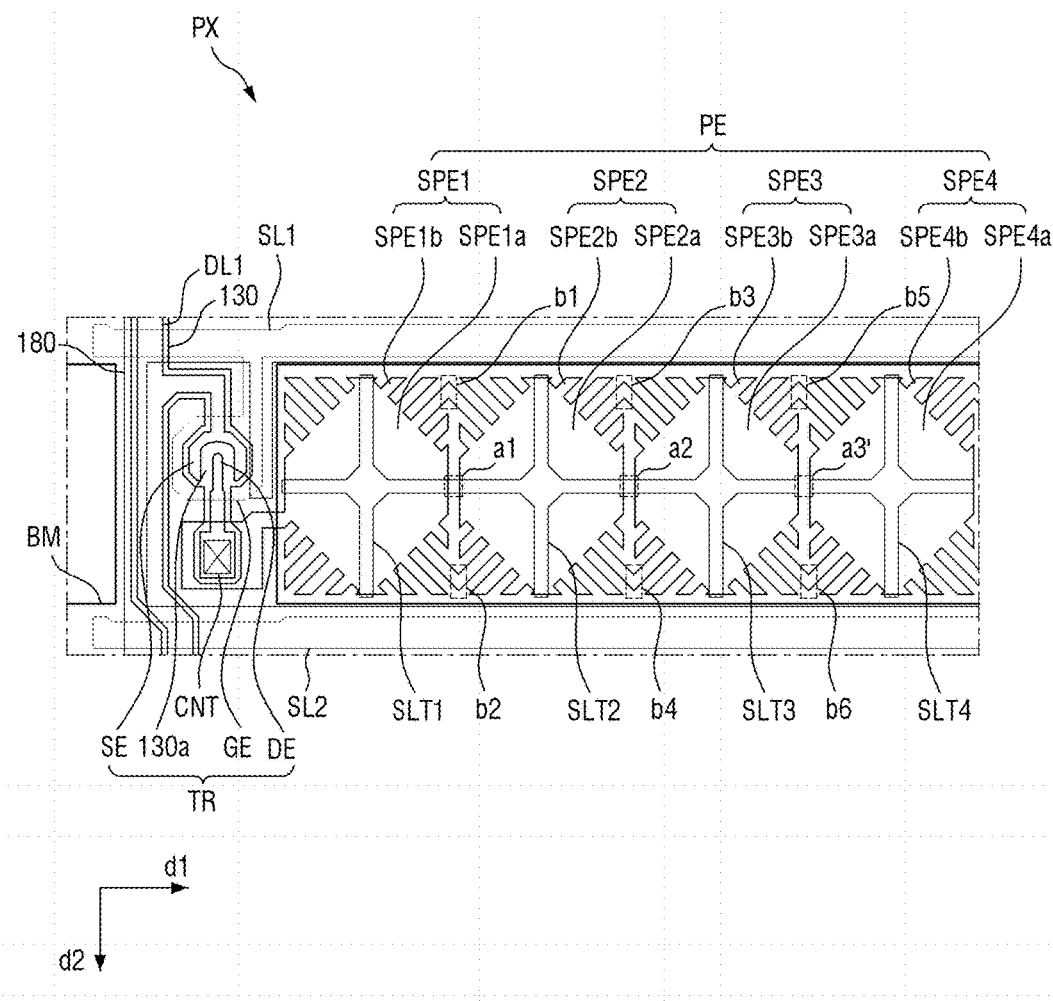

In addition, referring to FIG. 14, a third slit portion SLT3 may be connected to a second slit portion SLT2 but may not be connected to a fourth slit portion SLT4. That is, the second slit portion SLT2 may be connected to and meet the third slit portion SLT3 at a second connecting portion or area a2. In contrast, the third slit portion SLT3 may not be connected to the fourth slit portion SLT4 at an a3' area.

Therefore, in view of the electrical resistance of a common electrode CE (see FIG. 2), not all of the first through fourth slit portions SLT1 through SLT4 need to be connected to one another. As illustrated FIGS. 13 and 14, the third slit portion SLT3 is not necessarily connected to the second slit portion SLT2 or the fourth slit portion SLT4. In exemplary embodiments, for example, the second slit portion SLT2 similarly may or may not be connected to the adjacent first slit portion SLT1 or the adjacent third slit portion SLT3.

Figure 15:
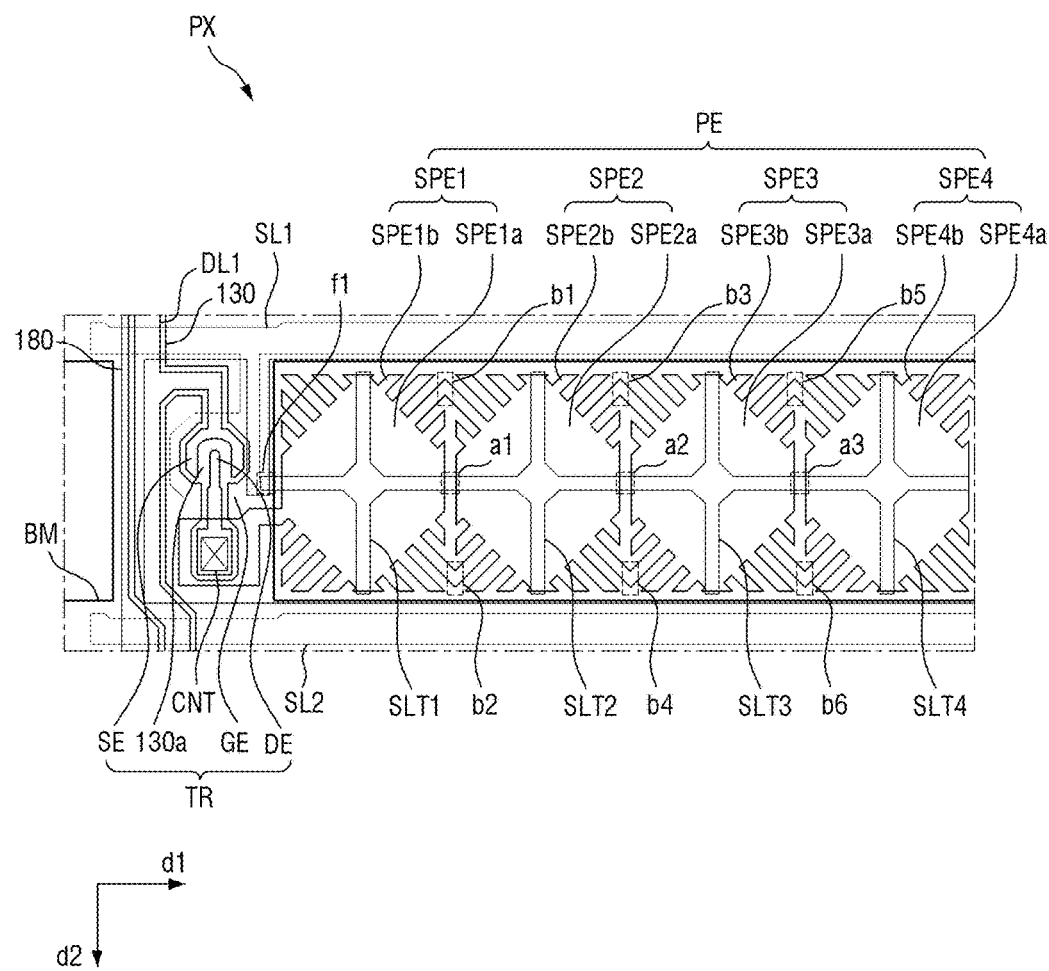

Referring to FIG. 15, a first slit portion SLT1 may further include an extension portion f1 as a distal end thereof which lengthwise extends toward a gate electrode GE. The extension portion f1 can reduce a texture phenomenon caused by a misalignment that occurs in a second direction d2 or a direction opposite to the second direction d2.

In one or more exemplary embodiment of an LCD according to the invention, a texture phenomenon caused by misalignment that occurs in a process of bonding an upper substrate of an upper display panel and a lower substrate of a lower display panel together may be reduced or effectively prevented.

In addition, in one or more exemplary embodiment of an LCD according to the invention, a reduction in transmittance of the LCD can be reduced.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid crystal display comprising:
   a first substrate;
   a pixel electrode which comprises on the first substrate:
      a first subpixel electrode defining a first plate-shaped portion thereof and a plurality of first branch portions thereof which extend from the first plate-shaped portion, and
      a second subpixel electrode which is disposed adjacent to and spaced apart from the first subpixel electrode, defining a second plate-shaped portion thereof and a plurality of second branch portions thereof which extend from the second plate-shaped portion,
      wherein at least one of the first branch portions of the first subpixel electrode is connected to at least one of the second branch portions of the second subpixel electrode spaced apart from the first subpixel electrode, at respective distal ends of the at least one of the first and second branch portions;
   a second substrate which faces the first substrate; and
   a common electrode which is disposed on the second substrate and defines:
      a first slit portion thereof which overlaps the first plate-shaped portion of the first subpixel electrode, and
      a second slit portion thereof which overlaps the second plate-shaped portion of the second subpixel electrode which is connected to the first slit portion,
   wherein
   the first slit portion extends further than the first plate-shaped portion of the first subpixel electrode to meet the second slit portion at a first connecting area, and
   the first connecting area at which the extended first slit portion meets the second slit portion does not overlap the first subpixel electrode or the second subpixel electrode.

2. The liquid crystal display of claim 1, wherein at least one of the first slit portion and the second slit portion of the common electrode is cross-shaped.

3. The liquid crystal display of claim 1, wherein at least one of the first plate-shaped portion of the first subpixel electrode and the second plate-shaped portion of the second subpixel electrode is rhombic.

4. The liquid crystal display of claim 1, wherein
   the first slit portion of the common electrode does not overlap the first branch portions of the first subpixel electrode, and
   the second slit portion of the common electrode does not overlap the second branch portions of the second subpixel electrode.

5. The liquid crystal display of claim 1, wherein
   the first slit portion of the common electrode defines a first horizontal portion thereof defining a length of the first horizontal portion which extends in a first direction, and a first vertical portion thereof defining a length of the first vertical portion which extends in a second direction different from the first direction and intersects the first horizontal portion, and
   the second slit portion of the common electrode defines a second horizontal portion thereof defining a length of the second horizontal portion which extends in the first direction, and a second vertical portion thereof defining a length of the second vertical portion which extends in the second direction and intersects the second horizontal portion, wherein the first horizontal portion of the first slit portion and the second horizontal portion of the second slit portion are connected to each other.

6. The liquid crystal display of claim 5, further comprising:
a scan line defining a length thereof which extends in the first direction; and
a data line defining a length thereof which extends in the second direction,
wherein at least one of the first vertical portion of the first slit portion and the second vertical portion of the second slit portion overlaps the scan line.

7. The liquid crystal display of claim 5, wherein
the first horizontal portion of the first slit portion extends further than the first plate-shaped portion of the first subpixel electrode to meet and be connected to the second horizontal portion of the second slit portion at the first connecting area which does not overlap the first subpixel electrode or the second subpixel electrode.

8. The liquid crystal display of claim 1, further comprising a scan line defining a length thereof which extends in a first direction,
wherein the first and second subpixel electrodes are disposed adjacent to and spaced apart from each other along the first direction.

9. The liquid crystal display of claim 1, wherein
the common electrode further defines a third slit portion thereof and a fourth slit portion thereof, and
the pixel electrode further comprises a third subpixel electrode which overlaps the third slit portion of the common electrode and a fourth subpixel electrode which is disposed adjacent to and spaced apart from the third subpixel electrode and overlaps the fourth slit portion of the common electrode.

10. The liquid crystal display of claim 9, wherein the third slit portion extends further than the third subpixel electrode to meet and be connected to at least one of the second slit portion and the fourth slit portion.

11. The liquid crystal display of claim 1, wherein
the pixel electrode further comprises a connecting electrode portion comprising a bent portion, and
at the respective distal ends of the at least one of the first and second branch portions, the at least one of the first branch portions of the first subpixel electrode is connected to the least one of the second branch portions of the second pixel electrode by the connecting electrode portion comprising the bent portion.

12. A liquid crystal display comprising:
a first substrate;
a pixel electrode which comprises a first subpixel electrode and a second subpixel electrode which is disposed adjacent to and spaced apart from the first subpixel electrode, on the first substrate;
a second substrate which faces the first substrate; and
a common electrode which is disposed on the second substrate and defines a first slit portion thereof overlapping the first subpixel electrode and a second slit portion thereof overlapping the second subpixel electrode,
wherein
the first slit portion defines each overlapping the first subpixel electrode:

a first horizontal portion thereof defining a length of the first horizontal portion which extends in a first direction, and
a first vertical portion thereof defining a length of the first vertical portion which extends in a second direction different from the first direction and intersects the first horizontal portion, and
the second slit portion defines each overlapping the second subpixel electrode:
a second horizontal portion thereof defining a length of the second horizontal portion which extends in the first direction, and
a second vertical portion thereof defining a length of the second vertical portion which extends in the second direction and intersects the second horizontal portion, along the first direction:
a length of the first horizontal portion extends from the first vertical portion overlapping the first subpixel electrode towards the second subpixel electrode, and
a length of the second horizontal portion extends from the second vertical portion overlapping the second subpixel electrode towards the first subpixel electrode to meet the length of the first horizontal portion at a first connecting area, and
the first connecting area at which the respective lengths of the first and second horizontal portions meet does not overlap the first subpixel electrode or the second subpixel electrode.

13. The liquid crystal display of claim 12, wherein
the first subpixel electrode defines a first plate-shaped portion thereof which overlaps the first slit portion of the common electrode and a plurality of first branch portions thereof which extend from the first plate-shaped portion, and
the second subpixel electrode defines a second plate-shaped portion thereof which overlaps the second slit portion of the common electrode and a plurality of second branch portions which extend from the second plate-shaped portion,
wherein at least one of the first branch portions of the first subpixel electrode is connected to at least one of the second branch portions of the second subpixel electrode, at respective distal ends of the at least one of the first and second branch portions.

14. The liquid crystal display of claim 13, wherein
the pixel electrode further comprises a connecting electrode portion comprising a bent portion, and
at the respective distal ends of the at least one of the first and second branch portions, the at least one of the first branch portions of the first subpixel electrode is connected to at least one of the second branch portions of the second subpixel electrode, by the connecting electrode portion comprising the bent portion.

15. The liquid crystal display of claim 13, wherein
the first branch portions of the first subpixel electrode do not overlap the first slit portion of the common electrode, and
the second branch portions of the second subpixel electrode do not overlap the second slit portion of the common electrode.

16. The liquid crystal display of claim 13, wherein
the first subpixel electrode comprises first through fourth areas defined by the first horizontal portion and the first vertical portion of the first slit portion of the common electrode, and
the first branch portions of the first subpixel electrode comprise first and second micro-branch portions which are disposed spaced apart from each other within at least one of the first through fourth areas,
wherein
a minimum distance between the first micro-branch portion and the first horizontal portion of the first slit portion of the common electrode is smaller than a minimum distance between the second micro-branch portion and the first horizontal portion, and
a length of the second micro-branch portion is greater than that of the first micro-branch portion.

17. The liquid crystal display of claim 12, further comprising:
a black matrix which is disposed on the second substrate;
a color filter which is disposed on the black matrix; and
an overcoat layer which is disposed on the color filter,
wherein the common electrode defining the first slit portion overlapping the first subpixel electrode and the second slit portion overlapping the second subpixel electrode is disposed on the overcoat layer.

18. The liquid crystal display of claim 12, further comprising:
a scan line defining a length thereof which is disposed in the first direction; and
a data line defining a length thereof which is disposed in the second direction.

19. The liquid crystal display of claim 18, wherein at least one of the first vertical portion of the first slit portion of the common electrode and the second vertical portion of the second slit portion of the common electrode overlaps the scan line.

20. The liquid crystal display of claim 16, wherein the first and second subpixel electrodes are disposed adjacent to and spaced apart from each other along one of the first direction and the second direction.

21. The liquid crystal display of claim 1, further comprising:
a scan line disposed on the first substrate, the scan line extending in a first direction; and
a data line disposed on the first substrate, the data line extending in a second direction which crosses the first direction,
wherein a width of the pixel electrode in the first direction is larger than a width of the pixel electrode in the second direction.

* * * * *